Sept. 23, 1930.  E. L. BEECHER  1,776,279

VARIABLE LOAD AIR SPRING

Filed Nov. 11, 1927

INVENTOR
EUGENE L. BEECHER
BY Wm. M. Cady
ATTORNEY

Patented Sept. 23, 1930

1,776,279

UNITED STATES PATENT OFFICE

EUGENE L. BEECHER, OF NEW HAVEN, CONNECTICUT, ASSIGNOR TO THE WESTING-HOUSE AIR BRAKE COMPANY, OF WILMERDING, PENNSYLVANIA, A CORPORATION OF PENNSYLVANIA

VARIABLE-LOAD AIR SPRING

Application filed November 11, 1927. Serial No. 232,552.

This invention relates to air springs for vehicles, and the principal object of the invention is to provide an air spring construction in which air spring pressure is varied according to the load on the vehicle.

Figure 1:
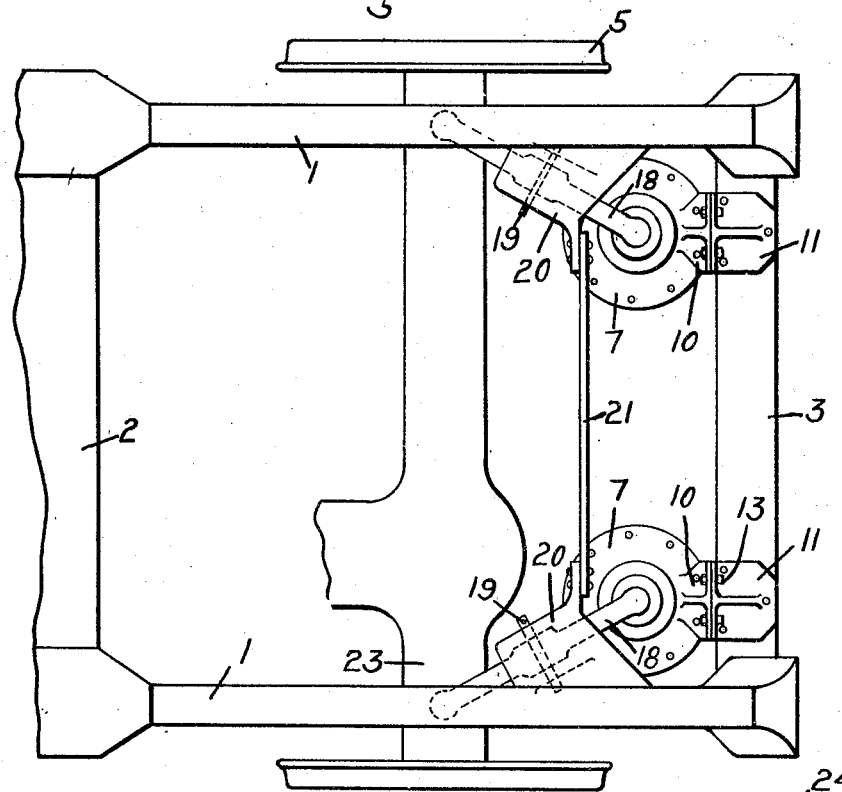
Figure 2:
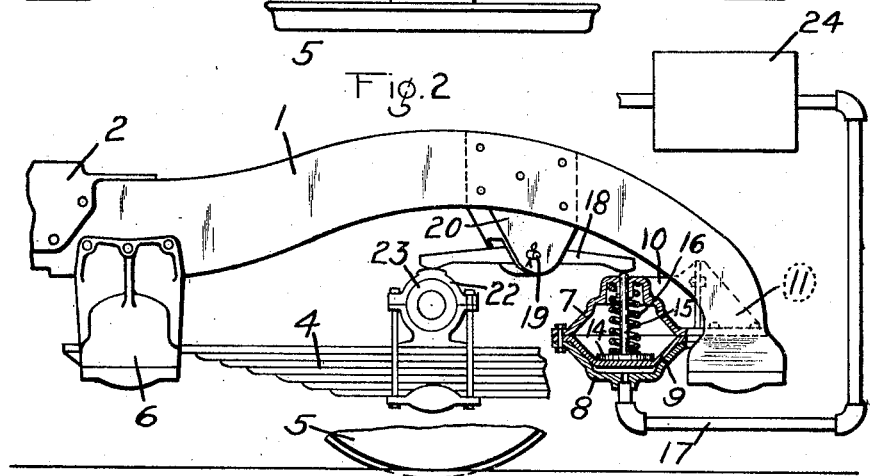

In the accompanying drawing, Fig. 1 is a plan view of a portion of a truck showing my invention applied thereto; and Fig. 2 a side elevation of the construction shown in Fig. 1.

In the drawing is shown half of a four wheel truck comprising side frame members 1 connected by a central cross member 2 and a cross member 3 at each end. A truck spring 4 is provided adjacent to each of the four wheels 5 of the truck, the inner ends of the springs being supported by brackets 6 secured to the frame members 1, and the outer ends at the outer ends of the frame members 1.

For each spring, a diaphragm chamber is provided comprising flanged casing sections 7 and 8 having a flexible diaphragm 9 clamped between the flanges of the sections. Each section 7 may be provided with a bracket extension 10 and corresponding bracket members 11 are secured to the cross members 2, the bracket extensions 10 being secured to the bracket members 11 by means of bolts 13. A pressure plate 14 engages the upper face of each diaphragm 9 and is provided with a stem 15 which extends upwardly through an opening in the casing section 7.

The pressure plate 14 is subject to the pressure of a coil spring 16 and the chamber at the opposite side of the diaphragm is connected to a pipe 17 through which fluid under pressure is supplied to the diaphragm.

Engaging the end of the stem 15 is one end of a pivoted lever 18, which is carried by a pivot pin 19. A bracket 20 is secured to the side frame member and the pivot pin 19 is provided with bearings in said bracket, the brackets at opposite sides being connected by a tie bar 21.

The other end of the lever 18 engages the spring clamp member 22 above the axle housing 23 and thereby the pressure of fluid supplied to the diaphragm 9 acts to augment the resistance of spring 4.

Means are provided, such as are disclosed in Patent No. 1,585,833 of S. G. Down, dated May 25, 1926, by which fluid under pressure is supplied to a storage reservoir 24, connected to pipe 17, at a pressure which is regulated according to the load on the car, and as the load on the car is increased, the pressure of fluid in the reservoir 24 is increased and as the load on the car is decreased, the pressure of fluid in the reservoir is correspondingly decreased.

Fluid under pressure at a pressure corresponding with the load on the car is thus supplied through pipe 17 to the diaphragm 9, and consequently the resistance of each spring 4 of the car truck is augmented to a degree corresponding with the load on the car.

By employing the lever 18, the diaphragm chamber may be located at any convenient place and the construction permits the installation of the air spring arrangement where the available space is limited, as in the case of the particular car truck illustrated in the drawing.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a car truck having vehicle springs and comprising side frame members and a cross member connecting the side members, of a bracket secured to said cross member, a pressure chamber secured to said bracket, a movable abutment in said chamber subject to fluid under pressure, and a lever pivotally mounted on a side frame member for transmitting pressure of fluid on said abutment to a vehicle spring.

2. The combination with a car truck having vehicle springs and comprising side frame members and a cross member connecting the side members and an axle housing to which said springs are secured, of a bracket secured to said cross member, a pressure chamber secured to said bracket, a movable abutment in said chamber subject to fluid under pressure, a bracket secured to a side member, and a lever pivoted to said bracket and engaging the axle housing for transmitting pressure of fluid on said abutment to a corresponding vehicle spring.

In testimony whereof I have hereunto set my hand.

EUGENE L. BEECHER.